W. I. HALL.
VINE MOWER.
APPLICATION FILED JUNE 30, 1909.
952,009.
Patented Mar. 15, 1910.
2 SHEETS—SHEET 1.
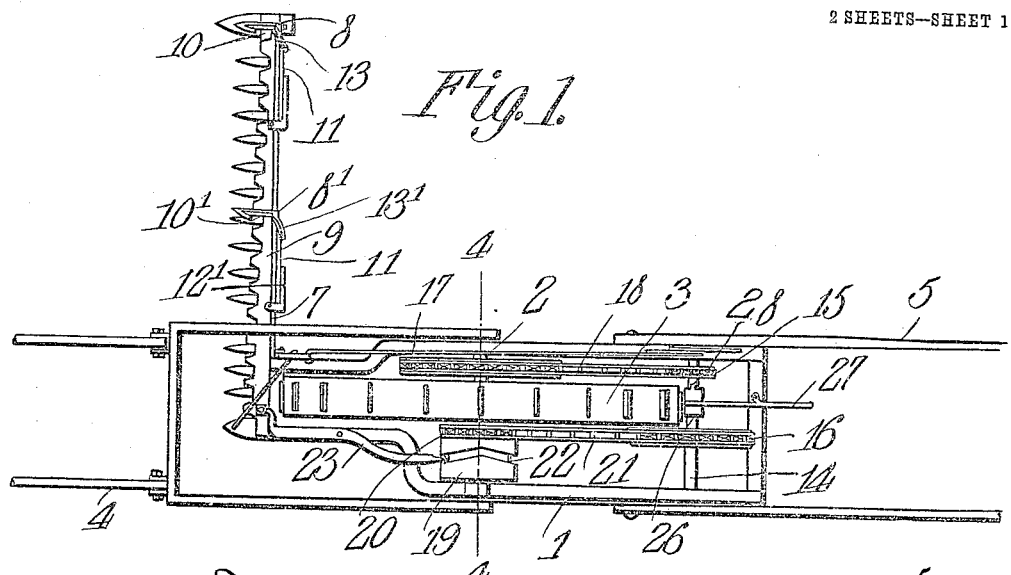
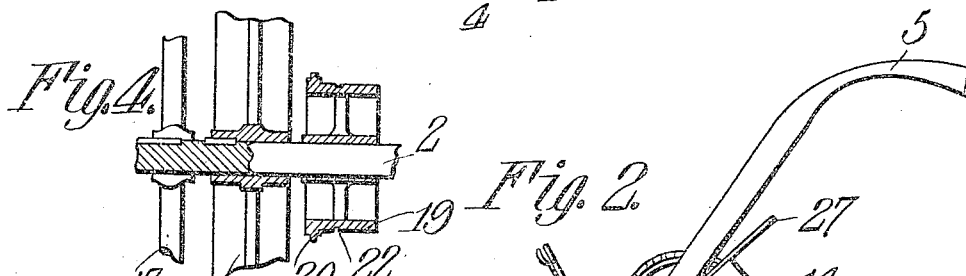
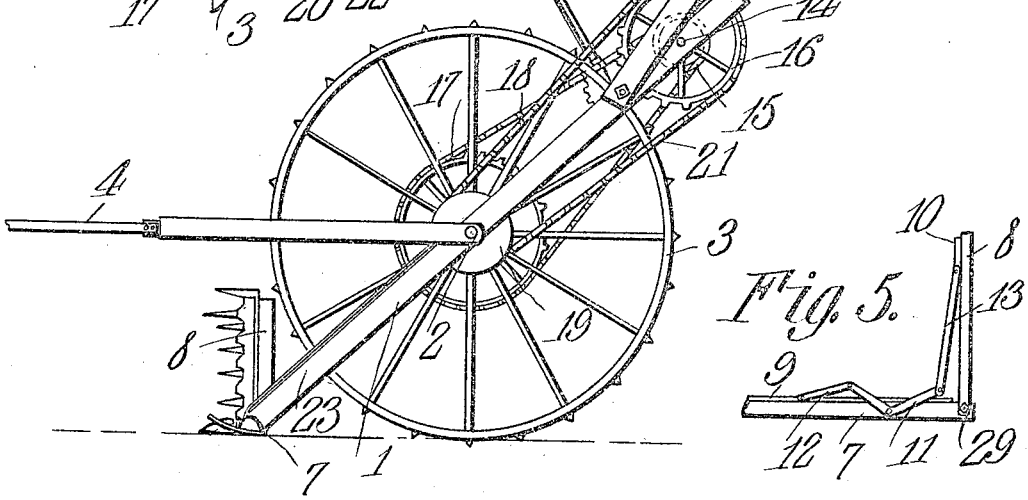
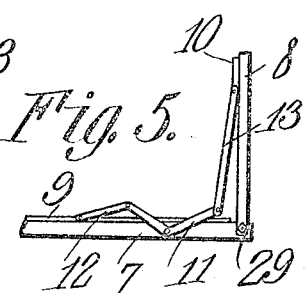
Witnesses
Inventor
William I. Hall
By C. A. Snow & Co.
Attorneys W. I. HALL.
VINE MOWER.
APPLICATION FILED JUNE 30, 1909.
952,009.
Patented Mar. 15, 1910.
2 SHEETS—SHEET 2.
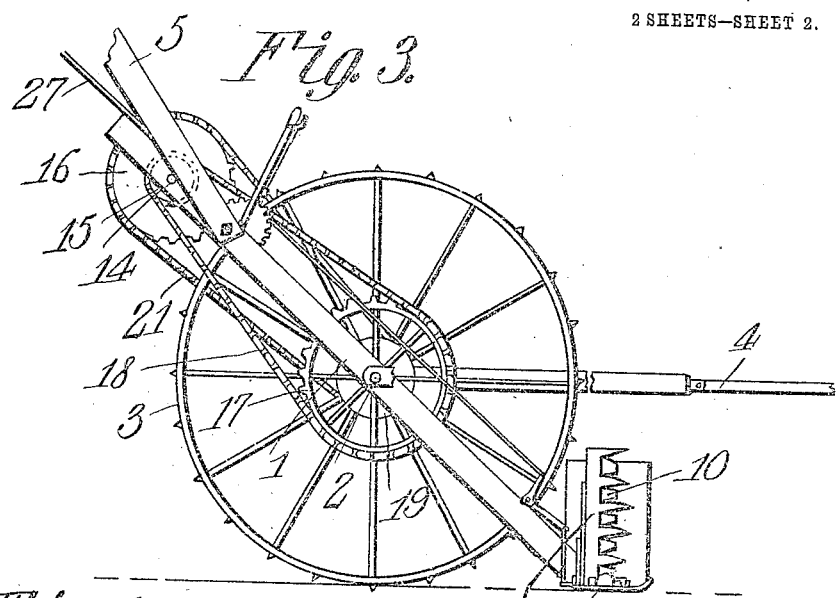
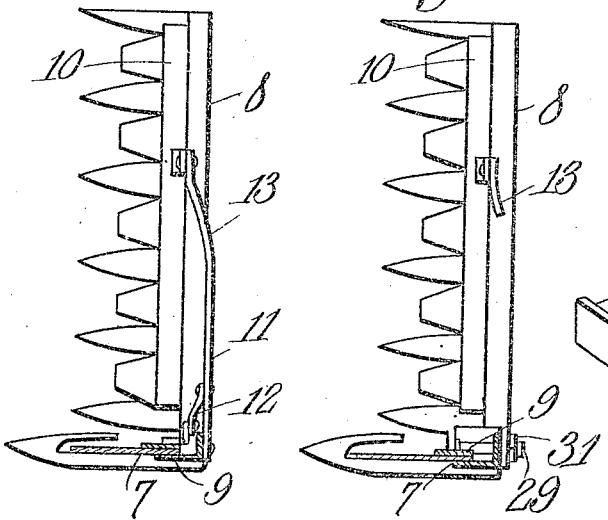
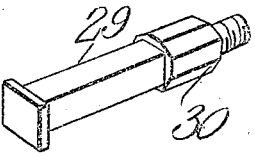
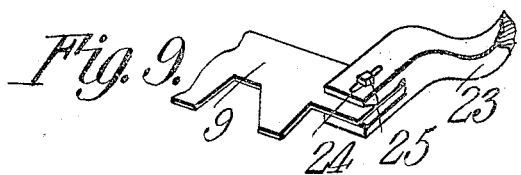
Witnesses
Inventor
William I. Hall
By C. A. Snow & Co.
Attorneys

UNITED STATES PATENT OFFICE.

WILLIAM I. HALL, OF ROSEHILL, NORTH CAROLINA.

VINE-MOWER.

952,009.  Specification of Letters Patent.  Patented Mar. 15, 1910.

Application filed June 30, 1909. Serial No. 505,237.

*To all whom it may concern:*

Be it known that I, WILLIAM I. HALL, a citizen of the United States, residing at Rosehill, in the county of Duplin and State of North Carolina, have invented a new and useful Vine-Mower, of which the following is a specification.

This invention relates to vine mowers, and it consists in the novel construction and arrangement of its parts, as hereinafter shown and described.

The object of the invention is to provide a mower especially adapted to be used for harvesting vines such as peas, etc., and the parts of the machine are so arranged that the vines may be harvested whether they lie upon the surface of the ground, or partly upon the surface of the ground and partly upon upright stalks or other supports.
With the above object in view the machine comprises a primary sickle-bar arranged for horizontal reciprocatory movement, and one or more secondary sickle-bars arranged for vertical or approximately vertical reciprocatory movement. The said vertically disposed sickle-bars derive their movement from the horizontal sickle-bar.

The frame of the mower is mounted upon a traction wheel, and means operatively connect the said traction wheel with the said horizontally disposed sickle-bar. The horizontally disposed sickle-bar severs the stalks or stems of the peas or vines in close proximity to the ground, while the vertically disposed sickle-bars sever the stalks of the vines, so that the vines which are cut in the swaths are severed from the vines which are left standing. Consequently, the vines are not left in a tangled state upon the surface of the ground, but lie thereon in distinct mats, which renders it comparatively easy to harvest the vines.

In the accompanying drawings:—Figure 1 is a top plan view of the mower. Fig. 2 is a side elevation of the same. Fig. 3 is an elevation of the opposite side of the mower from that shown in Fig. 2. Fig. 4 is a transverse section of a portion of the same, cut on the line 4—4 of Fig. 1. Fig. 5 is a rear edge view of the outer portion of the primary cutter-bar and its attachments. Fig. 6 is a transverse sectional view through the outer portion of the primary cutter-bar, showing the end cutter-bar in elevation. Fig. 7 is a transverse sectional view of the outer portion of the primary cutter-bar, cut on a different plane from that upon which the view illustrated in Fig. 6 is cut. Fig. 8 is a perspective view of a bolt for adjustably securing the secondary cutter-bar upon the primary cutter-bar. Fig. 9 is a perspective view of means for connecting the primary sickle-bar with an operating lever.

The mower consists of a frame 1, which is mounted upon an axle 2, and which in turn is supported by a traction wheel 3. Shafts 4 are connected at their rear ends with the frame 1, and at their forward portions are adapted to receive a draft animal. Handles 5 are fixed to the rear portion of the frame 1. A cutter-bar 7 is attached to the forward portion of the frame 1, and one end projects laterally beyond the side of said frame. At the extremity of that end of the said cutter-bar which projects beyond the side of the frame is provided a vertically disposed cutter-bar section 8. A sickle-bar 9 is mounted for reciprocation upon the cutter-bar 7, and a sickle-bar 10 is mounted for reciprocation along the cutter-bar section 8. A bell-crank lever 11 is fulcrumed to the rear edge of the cutter-bar 7 in the vicinity of the extremity of the end thereof which projects beyond the side of the frame 1, and a link 12, pivotally connects one end of the said bell-crank lever with the sickle-bar 9, and a link 13 pivotally connects the other end of the said bell-crank lever 11 with the sickle-bar 10.

A shaft 14 is journaled for rotation upon the frame 1 behind the traction wheel 3 and is provided with a loose sprocket wheel 15, and a fixed sprocket wheel 16. Said wheels 15 and 16 are located in planes beyond the opposite sides of the said traction wheel 3. A sprocket wheel 17 is fixed to the axle 2, and a sprocket chain 18 passes around the sprocket wheels 15 and 17. As has been stated, the traction wheel 3 is fixed to the axle 2. A cylinder 19 is journaled for rotation upon the axle 2, and is provided at one end with a series of teeth 20. A chain 21 passes around the series of teeth 20 and the sprocket wheel 16. The cylinder 19 is provided upon its periphery with a continuous zig-zag groove 22. A lever 23 is fulcrumed upon the frame 1, and has its working end pivotally connected with the sickle-bar 9, and its power end is inserted between the side walls of the zig-zag groove 22 in the cylinder 19. As illustrated in Fig. 9 of the drawings, the pivotal connection between the lever 23 and the sickle-bar 9 is effected by means of an elongated slot 24, provided in the lever 23, which receives a transversely disposed bolt 25, which also passes through the sickle-bar 9. By this arrangement it will be seen that the said lever 23 is permitted to swing in an arc, while the sickle-bar 9 may reciprocate. A clutch member 26 is slidably mounted upon the shaft 14 and is operatively connected with a lever 27, which is fulcrumed upon the frame 1. The said lever 27 is adapted to be swung, whereby the said clutch member 26 may be brought into engagement with the clutch hub 28 of the sprocket wheel 15, and thus the shaft 14 may be caused to rotate in unison with the sprocket wheel 15. It is understood that when the lever 27 is swung so that the clutch member 26 is moved away from the clutch hub 28, the said shaft will remain at rest while the sprocket wheel 15 rotates.

A non-circular bolt 29 is located at the outer end portion of the cutter-bar 7, and an octagonal sleeve 30 is slidably mounted upon the said bolt 29. The opening in the sleeve 30 snugly receives the non-circular bolt 29 and hence the sleeve is restrained against rotation upon the bolt 29, and the sleeve is held on the bolt by means of a nut 31, which is screw-threaded upon the said bolt 29. The cutter-bar section 8 is provided with an octagonal opening, which snugly receives the sleeve 30. Thus means is provided for connecting the cutter-bar section 8 with the cutter-bar 7, and by slipping the cutter bar 8 from the sleeve 30 and by swinging the upper end of the bar and replacing the octagonal opening over the sleeve of the said bolt, the cutter-bar 8 may be positioned at an angle with relation to the cutter-bar 7.

From the above description it is obvious that as the implement is drawn along the surface of the ground, rotary movement is transmitted from the traction wheel 3 to the axle 2, and through the connecting sprocket chains and sprocket wheels 18, 17 and 15, to the shaft 14. From the said shaft 14 rotary movement is transmitted through the sprocket wheel 16 and chain 21, to the cylinder 19. The several sprocket wheels are of different dimensions, so that the rotary movement as it is transmitted is magnified, whereby the cylinder 19 rotates at a greater rate of speed than the axle upon which it is journaled. As the said cylinder 19 rotates the sides of the zig-zag groove 22 oscillate the lever 23 upon its fulcrum point, and thus the sickle-bar 9 is reciprocated. As the said sickle-bar 9 reciprocates as described, the knives carried thereby will sever the stalks or stems of the vines upon the ground. At the same time the reciprocatory movement is transmitted from the sickle-bar 9 to the sickle-bar section 10 through the links 12 and 13 and bell-crank lever 11, and as the sickle-bar section 10 reciprocates vertically, or approximately so, it will sever the branches of the vines which are cut, from those which are left standing, and which project into the path of movement of the mower.

The parts as above described may also be used for cutting vines between adjacent rows of standing stalks, the horizontally disposed sickle-bar will sever the vines between the rows, while the vertically disposed sickle-bar section will trim the branches of the vines along the sides of the stalks.

In some cases it is desired that the swath of material which is cut as above indicated should be cut along a line between its longitudinal edges, and, to accomplish this, a second cutter-bar section 8' may be mounted upon the cutter-bar 7 in a manner similar to that as described in connection with the said cutter-bar section 8; but the sections 8 and 8' are spaced from each other as indicated in Fig. 1 of the drawings. A sickle-bar 10' is arranged for reciprocatory movement along the cutter-bar section 8', and the said sickle-bar 10 is operated from the sickle-bar 9 by means of a lever 11' and connecting links 12' and 13'. The arrangement of the lever 11' and the links 12' and 13' is similar to that described in connection with the lever 11, and links 12 and 13. Thus it will be seen that as a swath of material is cut, the sickle-bar 10' will be reciprocated vertically or approximately so, and that the said swath will be split or severed in a line intermediate of its edges. Thus the material which is left deposited upon the ground is in strips, and may be easily harvested or gathered.

What is claimed is:—

A mower comprising a frame, an axle journaled upon the frame, a traction wheel fixed to the axle, a cutter bar attached to the frame and projecting beyond one side thereof, a sickle bar mounted for reciprocatory movement upon the cutter bar, a cylinder journaled upon said axle and having a zig-zag peripheral groove, a lever fulcrumed upon the frame and having one end connected with the sickle bar and the other end lying in the groove of the cylinder, a shaft journaled in the frame beyond the periphery of the traction wheel, means for transmitting rotary movement from the traction wheel to the last said shaft and means for transmitting rotary movement from the last said shaft to the cylinder.

In testimony that I claim the foregoing as my own, I have hereto affixed my signature in the presence of two witnesses.

WILLIAM I. HALL.

Witnesses:
E. HUME TALBERT,
C. E. PREINKERT.